US012482963B2

(12) United States Patent
Yamanaka et al.

(10) Patent No.: US 12,482,963 B2
(45) Date of Patent: Nov. 25, 2025

(54) PRESS-FIT TERMINAL AND CONNECTOR DEVICE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Takuya Yamanaka, Mie (JP); Tetsuya Ito, Mie (JP); Mitsugu Furutani, Mie (JP); Tetsuya Shinozaki, Mie (JP); Takashi Tonosaki, Mie (JP); Hiroyuki Tanaka, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 339 days.

(21) Appl. No.: 18/027,546

(22) PCT Filed: Aug. 3, 2021

(86) PCT No.: PCT/JP2021/028697

§ 371 (c)(1),
(2) Date: Mar. 21, 2023

(87) PCT Pub. No.: WO2022/074916

PCT Pub. Date: Apr. 14, 2022

(65) Prior Publication Data

US 2023/0378671 A1 Nov. 23, 2023

(30) Foreign Application Priority Data

Oct. 7, 2020 (JP) ................................ 2020-169734

(51) Int. Cl.
*H01R 12/58* (2011.01)
*H01R 13/05* (2006.01)
*H01R 13/15* (2006.01)

(52) U.S. Cl.
CPC .......... *H01R 12/585* (2013.01); *H01R 13/05* (2013.01); *H01R 13/15* (2013.01)

(58) Field of Classification Search
CPC ...... H01R 12/585; H01R 13/05; H01R 13/15; H01R 13/422; H01R 13/428
See application file for complete search history.

(56) References Cited

U.S. PATENT DOCUMENTS

2004/0145880 A1* 7/2004 Watanabe ............. H05K 3/308 361/803
2013/0034976 A1* 2/2013 Tonosaki .............. H01R 13/03 439/84

(Continued)

FOREIGN PATENT DOCUMENTS

JP 2007-012279 A 1/2007
JP 2008-165987 A 7/2008

(Continued)

OTHER PUBLICATIONS

International Search Report issued on Oct. 12, 2021 for WO 2022/074916 A1 (4 pages).

*Primary Examiner* — Christopher M Koehler
*Assistant Examiner* — Carlos E Lopez-Pagan
(74) *Attorney, Agent, or Firm* — Venjuris, P.C.

(57) ABSTRACT

A press-fit terminal is provided with a press-fit portion including two contact pieces facing each other across an eye hole. Each of the two contact pieces includes a parallel portion in parallel to that of the other contact piece, a front spring portion and a rear spring portion. A thickness of the press-fit portion is 0.75 mm or more and 0.85 mm or less. When $G_1$ [$mm^3$] and $G_2$ [$mm^3$] denote cross-sectional sec- (Continued)

ondary moment of area per unit length of the front spring portion and cross-sectional secondary moment of area per unit length of the rear spring portion for the press-fit portion, $G_1+G_2$ is 0.030 or more and 0.080 or less. Further, when $\theta$ denotes a gradient of the front spring portion with respect to an inserting direction of the press-fit portion, $G_1 \tan \theta$ is 0.0024 or more and 0.0070 or less.

6 Claims, 6 Drawing Sheets

(56) References Cited

U.S. PATENT DOCUMENTS

| | | | | |
|---|---|---|---|---|
| 2017/0077627 | A1* | 3/2017 | Matsumoto | H01R 13/03 |
| 2017/0085016 | A1* | 3/2017 | Sasayama | H01R 12/585 |
| 2018/0183160 | A1* | 6/2018 | Shiomi | H01R 12/585 |

FOREIGN PATENT DOCUMENTS

| | | | |
|---|---|---|---|
| JP | 2015-225701 | A | 12/2015 |
| JP | 2019-160700 | A | 9/2019 |
| JP | 2020-166954 | A | 10/2020 |
| WO | 2008/038331 | A1 | 4/2008 |

* cited by examiner

*FIG. 7*

| | EX. A1 | EX. A2 | EX. A3 | EX. A4 | EX. B1 | EX. B2 | EX. B3 | EX. B4 | EX. B5 |
|---|---|---|---|---|---|---|---|---|---|
| G | 0.077 | 0.077 | 0.077 | 0.077 | 0.052 | 0.052 | 0.052 | 0.052 | 0.052 |
| $G_1\tan\theta$ | 0.0054 | 0.0074 | 0.0087 | 0.0103 | 0.0030 | 0.0040 | 0.0054 | 0.0064 | 0.0074 |
| Insertion Force [N] | 104.6 | 115.2 | 121.4 | 127.2 | 83.2 | 91.2 | 100.1 | 104.8 | 110.2 |
| Holding Force [N] | 57.2 | 60.4 | 60.5 | 62.2 | 49.0 | 50.0 | 52.2 | 52.4 | 53.3 |
| Contact Area [$mm^2$] | 1.36 | 1.44 | 1.40 | 1.36 | 1.04 | 1.11 | 1.15 | 1.17 | 1.16 |

FIG. 8

| | EX. C1 | EX. C2 | EX. C3 | EX. C4 | EX. C5 | EX. D1 | EX. D2 | EX. D3 | EX. D4 |
|---|---|---|---|---|---|---|---|---|---|
| G | 0.033 | 0.033 | 0.033 | 0.033 | 0.033 | 0.027 | 0.027 | 0.027 | 0.027 |
| $G_1 \tan\theta$ | 0.0020 | 0.0026 | 0.0030 | 0.0040 | 0.0047 | 0.0017 | 0.0023 | 0.0030 | 0.0035 |
| Insertion Force [N] | 68.1 | 74.5 | 77.7 | 85.5 | 89.0 | 63.1 | 68.8 | 75.8 | 78.4 |
| Holding Force [N] | 41.7 | 42.4 | 43.4 | 43.6 | 44.2 | 38.6 | 39.8 | 40.9 | 40.0 |
| Contact Area [$mm^2$] | 0.91 | 1.02 | 1.08 | 1.06 | 1.01 | 0.88 | 0.91 | 1.00 | 0.93 |

PRESS-FIT TERMINAL AND CONNECTOR DEVICE

CROSS REFERENCE TO RELATED APPLICATIONS

This application is a national phase of PCT application No. PCT/JP2021/028697, filed on 3 Aug. 2021, which claims priority from Japanese patent application No. 2020-169734, filed on 7 Oct. 2020, all of which are incorporated herein by reference.

TECHNICAL FIELD

The present disclosure relates to a press-fit terminal and a connector device.

BACKGROUND

Patent Document 1 discloses a press-fit terminal including a connecting portion composed of a wide slit portion penetrating through front and back surfaces and two beam members facing each other across the slit portion. In Patent Document 1, the beam member is formed to be narrow on a tip side and a rear end side of the connecting portion with respect to a center of the connecting portion, and the slit portion is formed such that a length from the center to the rear end side of the connecting portion is shorter than a length from the center to the tip side of the connecting portion.

Patent Document 2 discloses a press-fit terminal including an introducing portion to be introduced into a through hole, a pressure holding portion to be press-fit and held in the through hole and a body portion coupled to the pressure holding portion, the press-fit terminal being formed with an opening extending in a longitudinal direction from a center of the pressure holding portion toward the body portion and toward the introducing portion. In Patent Document 2, a ratio of a length in the longitudinal direction from the center of the pressure holding portion to one end of the opening on the side of the body portion and a length in the longitudinal direction from the center of the pressure holding portion to the other end of the opening on the side of the introducing portion is specified within a range of 80:220 to 120:180.

PRIOR ART DOCUMENT

Patent Document

Patent Document 1: WO 2008/038331 A1
Patent Document 2: JP 2008-165987 A

SUMMARY OF THE INVENTION

Problem to be Solved

A press-fit terminal is, for example, evaluated based on an insertion force, a holding force and a contact area. The insertion force is a load necessary to insert the press-fit terminal into a through hole. The holding force is a load necessary to pull out the press-fit terminal from the through hole. The contact area is an area of the press-fit terminal in contact with the inner surface of the through hole with the press-fit terminal inserted in the through hole.

If the insertion force is small, the press-fit terminal is easily inserted into the through hole and damage given to a board is suppressed in inserting the press-fit terminal into the through hole. Further, if the holding force and the contact area are large, the press-fit terminal is firmly held on the board and the electrical connection reliability of the press-fit terminal and a circuit formed on the board is also improved. Thus, it is required to reduce the insertion force and increase the holding force and the contact area for the press-fit terminal.

Generally, a reduction of the insertion force and increases of the holding force and the contact area are contradictory requests. Thus, in studying the shape of the press-fit terminal, it is important to balance the insertion force, the holding force and the contact area at a high level.

Particularly, for the press-fit terminal having a large plate thickness of 0.75 to 0.85 mm, the insertion force tends to be large. If the insertion force is too large, the board may be damaged. Thus, for the press-fit terminal having the large plate thickness of 0.75 to 0.85 mm, it is more important to balance the insertion force, the holding force and the contact area at a high level within a range in which excessive damage on the board can be suppressed.

Accordingly, the present disclosure aims to balance an insertion force, a holding force and a contact area at a high level for a press-fit terminal having a plate thickness of 0.75 to 0.85 mm.

Means to Solve the Problem

A press-fit terminal of the present disclosure is a press-fit terminal to be press-fit into a through hole formed in a board and is provided with a press-fit portion including two contact pieces facing each other across an eye hole, each of the two contact pieces including a parallel portion in parallel to that of the other contact piece, a front spring portion extending from the parallel portion in an inserting direction of the press-fit portion and a rear spring portion extending from the parallel portion in a direction opposite to the inserting direction of the press-fit portion, a thickness of the press-fit portion being 0.75 mm or more and 0.85 mm or less, when $G_1$ [$mm^3$] and $G_2$ [$mm^3$] denote cross-sectional secondary moment of area per unit length of the front spring portion and cross-sectional secondary moment of area per unit length of the rear spring portion calculated under the following conditions for the press-fit portion, $G_1+G_2$ being 0.030 or more and 0.080 or less, and when θ denotes a gradient of the front spring portion with respect to the inserting direction of the press-fit portion, $G_1 \tan\theta$ being 0.0024 or more and 0.0070 or less,

[conditions]

- the inserting direction of the press-fit terminal being a forward direction and the direction opposite to the inserting direction being a rearward direction,
- a position of 0.1 mm from and behind a front end of the eye hole being a front reference and a position of 0.1 mm from and in front of a rear end of the eye hole being a rear reference,
- assuming a front reference plane perpendicular to an outer edge of the front spring portion from an inner edge of the front spring portion at the front reference, a cross-sectional secondary moment of the front spring portion in the front reference plane being denoted by $I_1$ [$mm^4$],
- assuming a rear reference plane perpendicular to an outer edge of the rear spring portion from an inner edge of the rear spring portion at the rear reference, a cross-sectional secondary moment of the rear spring portion in the rear reference plane being denoted by $I_2$ [$mm^4$], a length in the inserting direction of the press-fit portion from an intersection of a straight line extending in a direction perpendicular to the front reference plane from an intersection of the front reference plane and the outer edge of the front spring portion and a straight line extending along an outer edge of the parallel portion to the front end of the eye hole being denoted by $L_1$ [mm], a length in the inserting direction of the press-fit portion from an intersection of a straight line extending in a direction perpendicular to the rear reference plane from an intersection of the rear reference plane and the outer edge of the rear spring portion and a straight line extending along the outer edge of the parallel portion to the rear end of the eye hole being denoted by $L_2$ [mm], and the cross-sectional secondary moment of area per unit length of the front spring portion $G_1$ being $I_1/L_1$ [$mm^3$] and the cross-sectional secondary moment of area per unit length of the rear spring portion $G_2$ being $I_2/L_2$ [$mm^3$].

Effect of the Invention

According to the present disclosure, an insertion force, a holding force and a contact area can be balanced at a high level for a press-fit terminal having a plate thickness of 0.75 to 0.85 mm.

BRIEF DESCRIPTION OF THE DRAWINGS

FIG. 7 is a table showing evaluation results of press-fit terminals.

FIG. 8 is a table showing evaluation results of press-fit terminals.

DETAILED DESCRIPTION TO EXECUTE THE INVENTION

Description of Embodiments of Present Disclosure

Figure 1:
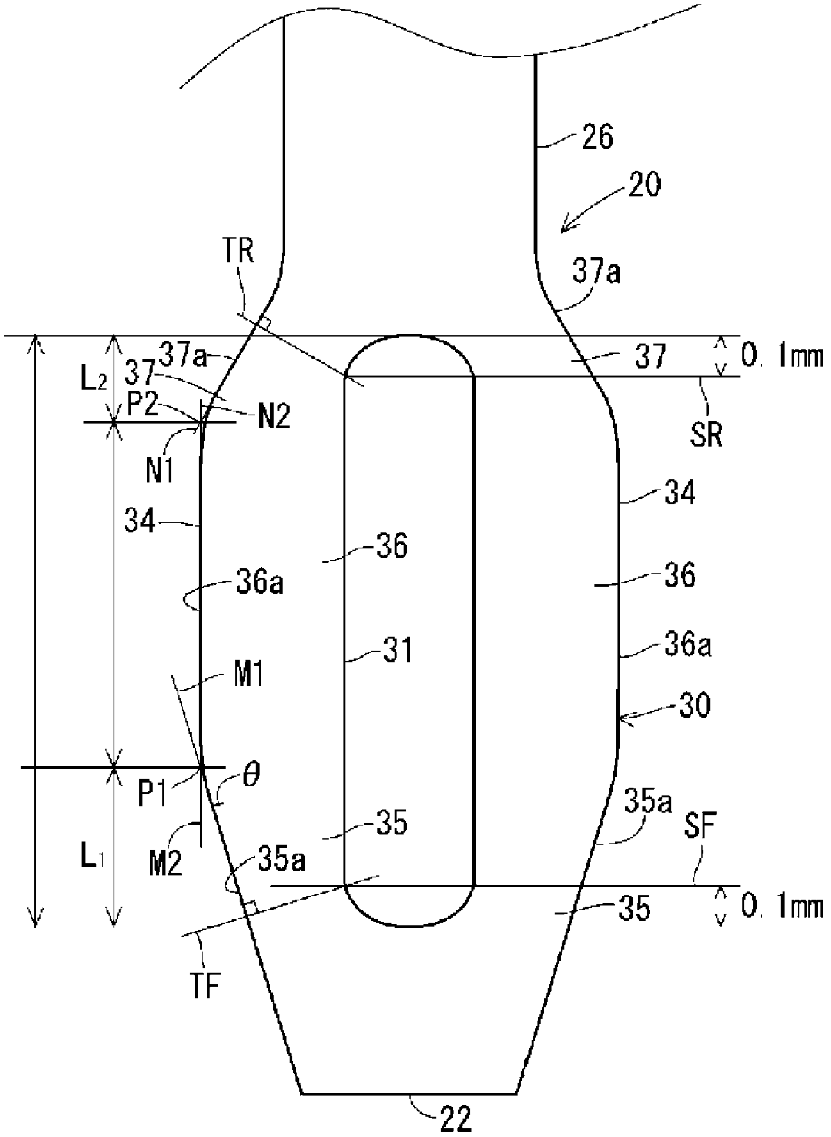
FIG. 1 is a front view showing a press-fit terminal according to an embodiment.

First, embodiments of the present disclosure are listed and described.

The press-fit terminal of the present disclosure is as follows.

(1) The press-fit terminal of the present disclosure is to be press-fit into a through hole formed in a board, and provided with a press-fit portion including two contact pieces facing each other across an eye hole, each of the two contact pieces including a parallel portion in parallel to that of the other contact piece, a front spring portion extending from the parallel portion in an inserting direction of the press-fit portion and a rear spring portion extending from the parallel portion in a direction opposite to the inserting direction of the press-fit portion, a thickness of the press-fit portion being 0.75 mm or more and 0.85 mm or less, when $G_1$ [$mm^3$] and $G_2$ [$mm^3$] denote front cross-sectional secondary moment of area per unit length of the front spring portion and cross-sectional secondary moment of area per unit length of the rear spring portion calculated under the following conditions for the press-fit portion, $G_1+G_2$ being 0.030 or more and 0.080 or less, and when θ denotes a gradient of the front spring portion with respect to the inserting direction of the press-fit portion, $G_1 \tan\theta$ being 0.0024 or more and 0.0070 or less,

[conditions]

the inserting direction of the press-fit terminal being a forward direction and the direction opposite to the inserting direction being a rearward direction, a position of 0.1 mm from and behind a front end of the eye hole being a front reference and a position of 0.1 mm from and in front of a rear end of the eye hole being a rear reference, assuming a front reference plane perpendicular to an outer edge of the front spring portion from an inner edge of the front spring portion at the front reference, a cross-sectional secondary moment of the front spring portion in the front reference plane being denoted by $I_1$ [$mm^4$], assuming a rear reference plane perpendicular to an outer edge of the rear spring portion from an inner edge of the rear spring portion at the rear reference, a cross-sectional secondary moment of the rear spring portion in the rear reference plane being denoted by $I_2$ [$mm^4$], a length in the inserting direction of the press-fit portion from an intersection of a straight line extending in a direction perpendicular to the front reference plane from an intersection of the front reference plane and the outer edge of the front spring portion and a straight line extending along an outer edge of the parallel portion to the front end of the eye hole being denoted by $L_1$ [mm], a length in the inserting direction of the press-fit portion from an intersection of a straight line extending in a direction perpendicular to the rear reference plane from an intersection of the rear reference plane and the outer edge of the rear spring portion and a straight line extending along the outer edge of the parallel portion to the rear end of the eye hole being denoted by $L_2$ [mm], and the cross-sectional secondary moment of area per unit length of the front spring portion $G_1$ being $I_1/L_1$ [$mm^3$] and the cross-sectional secondary moment of area per unit length of the rear spring portion $G_2$ being $I_2/L_2$ [$mm^3$].

According to this press-fit terminal, since $G_1+G_2$ is 0.030 or more and 0.080 or less, and $G_1 \tan\theta$ is 0.0024 or more and 0.0070 or less, an insertion force, a holding force and a contact area can be balanced at a high level for the press-fit terminal having the thickness of 0.75 mm or more and 0.85 mm or less.

(2) In the press-fit terminal of (1), $G_1+G_2$ may be 0.030 or more and 0.060 or less, and $G_1 \tan\theta$ may be 0.0028 or more and 0.0060 or less. The insertion force, the holding force and the contact area can be balanced at an even higher level for the press-fit terminal having the thickness of 0.75 mm or more and 0.85 mm or less.

(3) In the press-fit terminal of (1) or (2), a thickness of the press-fit portion may be 0.8 mm.

(4) In the press-fit terminal of (1) or (2), the outer edge of the front spring portion may be inclined inward in a width direction of the press-fit portion toward front, and the outer edge of the rear spring portion may be inclined inward in the width direction of the press-fit portion toward rear. In this way, the front spring portion and the rear spring portion are easily deformed.

(5) In the press-fit terminal of any one of (1) to (4), an outward facing part of the parallel portion is formed into an arcuate shape when viewed along the inserting direction. In this way, a contact area of the parallel portion and the inner peripheral surface of the through hole is increased.

(6) A connector device may be provided with a connector including the press-fit terminal of (5) and a board formed with a through hole, the press-fit portion of the press-fit terminal being press-fit into the through hole, and a radius of curvature of the outward facing part of the parallel portion being equal to or smaller than an inner circumference radius of the through hole when viewed along the inserting direction. In this way, the contact area of the parallel portion and the inner peripheral surface of the through hole is increased.

DETAILS OF EMBODIMENT OF PRESENT DISCLOSURE

Specific examples of a press-fit terminal and a connector device of the present disclosure are described below with reference to the drawings. Note that the present disclosure is not limited to these illustrations and is intended to be represented by claims and include all changes in the scope of claims and in the meaning and scope of equivalents.

Embodiment

Figure 2:
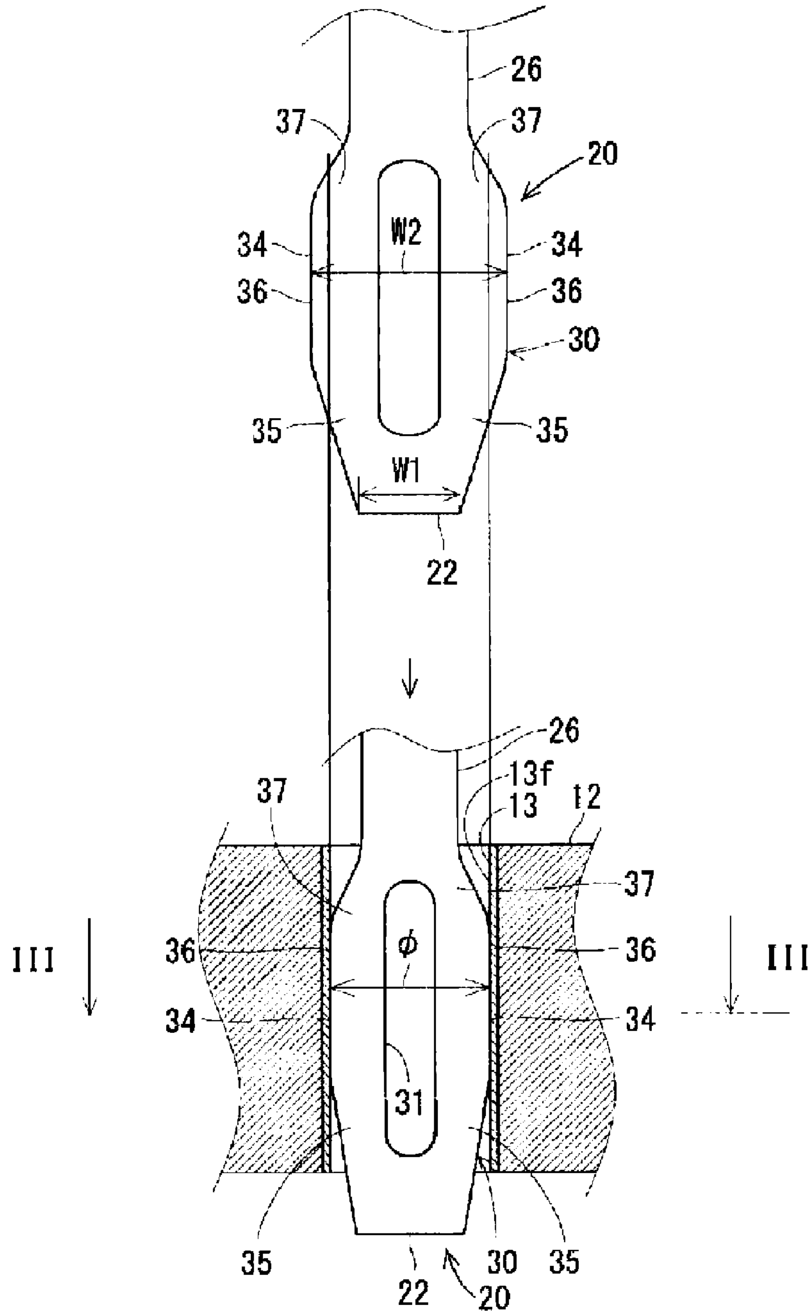
FIG. 2 is a diagram showing a state where a press-fit portion is inserted in a through hole.
Figure 3:
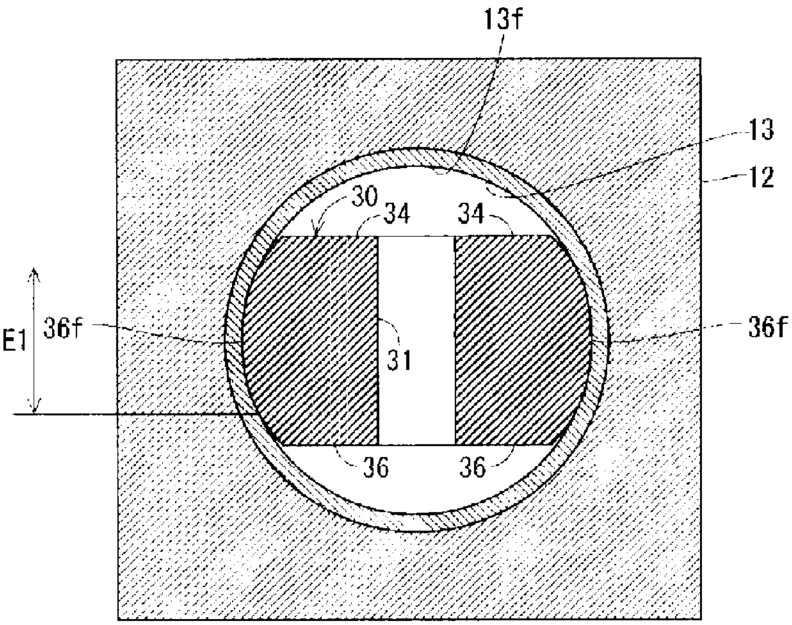
FIG. 3 is a section along III-III of FIG. 2.

Hereinafter, a press-fit terminal according to an embodiment is described. FIG. 1 is a front view of a press-fit terminal 20. FIG. 2 is a diagram showing a state where a press-fit portion 30 is inserted in a through hole 13. FIG. 2 shows the press-fit terminal 20 before being inserted into the through hole 13 and the press-fit terminal 20 inserted in the through hole 13. FIG. 3 is a section along III-III of FIG. 2.

The press-fit terminal 20 is a terminal to be press-fit into the through hole 13 formed in a board 12. Here, the board 12 is formed by an insulating plate such as a glass epoxy plate. The board 12 is formed with the through holes 13 penetrating through the front and back surfaces. The through hole 13 is a circular hole. The through hole 13 may be a rectangular hole or the like. An electrically conductive layer 13*f* made of metal such as copper is formed on the inner surface of the through hole 13. With the press-fit terminal 20 press-fit in the through hole 13, the press-fit terminal 20 is in contact with the electrically conductive layer 13*f* and electrically connected to the electrically conductive layer 13*f*. The electrically conductive layer 13*f* may be connected to a circuit formed on the front surface or the like of the board 12.

The press-fit terminal 20 is formed of metal such as copper or copper alloy. The press-fit terminal 20 may be formed, for example, by press-working a metal plate. Plating of tin, tin alloy or the like may be formed on the surface of the press-fit terminal 20.

The press-fit terminal 20 includes the press-fit portion 30. In this embodiment, a tip part 22 is connected to one end part of the press-fit portion 30, and a base end part 26 is connected to the other end part of the press-fit portion 30. The tip part 22 is a part to be first inserted into the through hole 13 when the press-fit terminal 20 is inserted into the through hole 13. The base end part 26 is a part connected to a part to be electrically connected to the electrically conductive layer 13*f* of the through hole 13. In an example shown in FIG. 6 to be described later, the base end part 26 is connected to a connector terminal portion 54. An inserting direction of the press-fit portion 30 is referred to as a forward direction, and a direction opposite to the inserting direction is referred to as a rearward direction.

The press-fit portion 30 is a part provided between the tip part 22 and the base end part 26. A width W2 (here, a maximum width) of the press-fit portion 30 is larger than a width W1 of the tip part 22 and further larger than a diameter $\phi$ of the through hole 13. Thus, the press-fit portion 30 can contact the inner peripheral surface of the through hole 13. The press-fit portion 30 may be understood as a part for obtaining electrical connection to the electrically conductive layer 13*f* by being held in contact with the inner peripheral surface of the through hole 13.

More specifically, the press-fit terminal 20 is in the form of a plate elongated straight as a whole.

The tip part 22 includes a tapered part gradually narrowed toward a tip side. By the presence of the tapered part, the press-fit terminal 20 is easily inserted into the through hole 13. The tip part may include a rectangular plate-like part having a constant width. In this case, a tapered part may be formed on a side forward of the rectangular plate part. The tip part 22 is insertable into the through hole 13 while being spaced apart from the inner peripheral surface of the through hole 13.

The base end part 26 includes a rectangular plate-like part having a constant width. Both side edges of this rectangular plate-like part are parallel to each other. A width of the base end part 26 is smaller than the width W2 of the press-fit portion 30. The base end part may not be in form of a rectangular plate. For example, the base end part may be shaped to be gradually narrowed or widened toward the press-fit portion. The base end part may have a part having a larger width than the press-fit portion.

The press-fit portion 30 is provided between the tip part 22 and the base end part 26. The press-fit portion 30 includes two contact pieces 34 facing each other across an eye hole 31. The eye hole 31 is a hole elongated in a direction connecting the tip part 22 and the base end part 26. Specific examples of the shape of the eye hole 31 include a perfect circular shape, an oval shape, a square shape and a rectangular shape. The eye hole 31 is preferably elongated in the inserting direction of the press-fit terminal. The contact piece 34 is in the form of an elongated plate. One end part of each of the two contact pieces 34 is connected to the tip part 22. The other end parts of the two contact pieces 34 are connected to the base end part 26.

Each of the two contact pieces 34 includes a parallel portion 36, a front spring portion 35 and a rear spring portion 37.

The parallel portions 36 of the respective two contact pieces 34 are arranged in parallel to each other. More specifically, outer edges 36*a* of the two parallel portions 36 are arranged linearly along a front-rear direction and in parallel to each other. Inner edges of the two parallel portions 36 are also arranged linearly along the front-rear direction and in parallel to each other. Of course, depending on the shape of the eye hole 31, the inner edges of the two parallel portions 36 may be partially or entirely curved.

The front spring portion 35 is a part extending from the parallel portion 36 in the inserting direction (forward direction) of the press-fit terminal 20. The front spring portion 35 is a part to be more easily deformed than the parallel portion 36 when the press-fit portion 30 is inserted into the through hole 13. An outer edge 35*a* of the front spring portion 35 is inclined inward in a width direction of the press-fit portion 30 toward the front. That is, the outer edge 35*a* of the front spring portion 35 is connected to the outer edge 36*a* of the parallel portion 36 at a rear end, gradually inclined inward in the width direction of the press-fit portion 30 toward the front, and connected to an outer edge of the tip part 22 at a front end.

The outer edge 35*a* of the front spring portion 35 may be entirely straight, may be entirely curved or may have a combined shape of a straight line and a curve. The outer edge 35*a* of the front spring portion 35 and the outer edge 36*a* of the parallel portion 36 may be connected via a curve or may be connected while forming an angle. Here, the outer edge 35*a* of the front spring portion 35 and the outer edge 36*a* of the parallel portion 36 are connected via an outward convex curve. The outer edge 35*a* of the front spring portion 35 and the outer edge of the tip part 22 may be connected via a curve, may be connected while forming an angle or may be linearly connected. Here, the outer edge 35*a* of the front spring portion 35 is linearly connected to the outer edge of the tip part 22.

The rear spring portion 37 is a part extending from the parallel portion 36 in the direction (rearward direction) opposite to the inserting direction of the press-fit terminal 20. The rear spring portion 37 is a part to be more easily deformed than the parallel portion 36 when the press-fit portion 30 is inserted into the through hole 13. The front spring portion 35 and the rear spring portion 37 are easily deformed before and after the parallel portion 36, whereby the parallel portion 36 can be displaced inward without being largely inclined. An outer edge 37*a* of the rear spring portion 37 is inclined inward in the width direction of the press-fit portion 30 toward the rear. That is, the outer edge 37*a* of the rear spring portion 37 is connected to the outer edge 36*a* of the parallel portion 36 at a front end, gradually inclined inward in the width direction of the press-fit portion 30 toward the rear, and connected to an outer edge of the base end part 26 at a rear end.

The outer edge 37*a* of the rear spring portion 37 may be entirely straight, may be entirely curved or may have a combined shape of a straight line and a curve. The outer edge 37*a* of the rear spring portion 37 and the outer edge 36*a* of the parallel portion 36 may be connected via a curve or may be connected while forming an angle. Similarly, the outer edge 37*a* of the rear spring portion 37 and the outer edge of the base end part 26 may be connected via a curve or may be connected while forming an angle. Here, an intermediate part of the outer edge 37*a* of the rear spring portion 37 is straight and both end side parts thereof are curved.

When viewed along the inserting direction of the press-fit terminal 20, an outward facing part of the parallel portion 36 is formed into an arcuate surface 36*f* convex outward. If the outward facing part of the parallel portion 36 is formed into the arcuate surface 36*f*, this arcuate surface 36*f* is expected to contact the inner peripheral surface of the through hole 13 in a large area.

Figure 4:
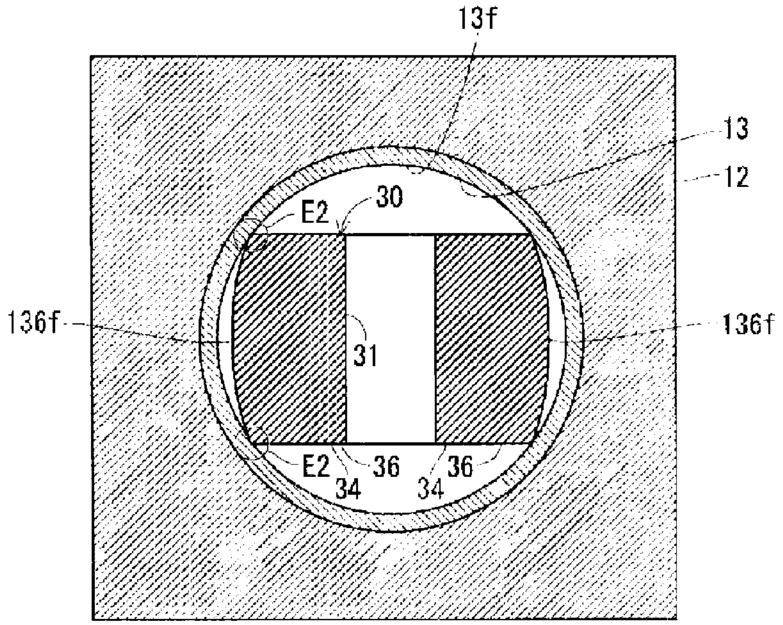
FIG. 4 is a section showing another press-fit terminal.

A radius of curvature r of this arcuate surface 36*f* is preferably equal to or smaller than an inner circumference radius (ϕ/2) of the through hole 13. If the radius of curvature r of this arcuate surface 36*f* is equal to the inner circumference radius (ϕ/2) of the through hole 13, the entire arcuate surface 36*f* is expected to contact the inner peripheral surface of the through hole 13. Note that the radius of curvature r of this arcuate surface 36*f* and the inner circumference radius (ϕ/2) of the through hole 1 equal to each other may mean to be equal within a manufacturing error range. For example, the radius of curvature r of this arcuate surface 36*f* may be equal to the inner circumference radius (ϕ/2) of the through hole 13 within an error range of ±20%. Further, even if the radius of curvature r of this arcuate surface 36*f* is smaller than the inner circumference radius (ϕ/2) of the through hole 13, a curved surface part in a center of the arcuate surface 36*f* is expected to contact the inner peripheral surface of the through hole 13 in a large area as compared to the case where the radius of curvature r of this arcuate surface 36*f* is larger than the inner circumference radius (ϕ/2) of the through hole 13 (see a range E1 of FIG. 3). This is because both edge parts of an arcuate surface 136*f* are supposed to contact the inner peripheral surface of the through hole 13 in a smaller area than in the above case, for example, if the radius of curvature r of this arcuate surface 36*f* is larger than the inner circumference radius (ϕ/2) of the through hole 13 as shown in FIG. 4 (circled parts E2 of FIG. 4). Even if the radius of curvature r of this arcuate surface 36*f* is smaller than the inner circumference radius (ϕ/2) of the through hole 13, the radius of curvature r of this arcuate surface 36*f* is preferably 70% or more of the inner circumference radius (ϕ/2) of the through hole 13.

Outward facing parts of the front spring portion 35 and the rear spring portion 37 are also similarly formed into arcuate surfaces.

It is not essential that the outward facing parts of the parallel portion 36, the front spring portion 35, the rear spring portion 37 are formed into the above shapes when viewed along the inserting direction of the press-fit terminal 20. For example, the outward facing parts of the parallel portion 36, the front spring portion 35, the rear spring portion 37 may be formed into flat surfaces. Further, a case where the radius of curvature r of this arcuate surface 36*f* is larger than the inner circumference radius (ϕ/2) of the through hole 13 as shown in FIG. 4 is not excluded.

A thickness of the press-fit portion 30 is 0.75 mm or more and 0.85 mm or less. Preferably, the thickness of the press-fit portion 30 is 0.8 mm Here, the thickness of 0.8 mm is within a manufacturing error range as understood from the common general technical knowledge of a person skilled in the art. A manufacturing error is, for example, 0.8 mm±40 μm.

As just described, if the thickness of the press-fit portion 30 is as thick as 0.75 mm or more and 0.85 mm or less, an insertion force into the through hole is thought to become excessive if a press-fit terminal is formed by directly applying a shape applied to a thinner press-fit portion or applying a similar shape. This is because an increase in the thickness of the press-fit portion directly leads to an increase of the insertion force. On the other hand, the board itself is not necessarily reinforced according to a thickness increase of the press-fit portion or excellent in strength. Thus, if the thickness of the press-fit portion 30 is as thick as 0.75 mm or more and 0.85 mm or less, it is more important to balance an insertion force, a holding force and a contact area at a high level within a range in which excessive damage on the board can be suppressed.

From such a perspective, each part of the press-fit portion 30 is configured to have the following size and shape.

First, if $G_1$ [$mm^3$] and $G_2$ [$mm^3$] denote cross-sectional secondary moment of area per unit length of the front spring portion and cross-sectional secondary moment of area per unit length of the rear spring portion calculated under the following conditions for the press-fit portion 30, $G_1+G_2$ is 0.030 or more and 0.080 or less.

Further, if θ denotes a gradient of the front spring portion 35 with respect to the inserting direction of the press-fit portion 30, $G_1 \tan\theta$ is 0.0024 or more and 0.0070 or less.

[Conditions]

First, a position of 0.1 mm from and behind the front end of the eye hole 31 is set as a front reference SF. In FIG. 1, the front reference SF is indicated by a straight line orthogonal to the front-rear direction. Similarly, a position of 0.1 mm from and in front of the rear end of the eye hole 31 is set as a rear reference SR. In FIG. 1, the rear reference SR is indicated by a straight line orthogonal to the front-rear direction.

A front reference plane TF is assumed which is perpendicular to the outer edge 35*a* of the front spring portion 35 from the inner edge of the front spring portion 35 at the front reference SF. Here, the front reference plane TF perpendicular to the outer edge 35*a* of the front spring portion 35 means the front reference plane TF perpendicular to the outer edge 35*a* of the front spring portion 35, which can be observed when the press-fit portion 30 is viewed along a thickness direction thereof. A cross-sectional secondary moment of the front spring portion 35 in this front reference plane TF is denoted by $I_1$ [$mm^4$].

Similarly, a rear reference plane TR is assumed which is perpendicular to the outer edge 37*a* of the rear spring portion 37 from the inner edge of the rear spring portion 37 at the rear reference SR, and a cross-sectional secondary moment of the rear spring portion 37 in this rear reference plane TR is denoted by $I_2$ [$mm^4$].

Further, in a front view when the press-fit portion 30 is observed along the thickness direction thereof, a straight line M1 is extended in a direction perpendicular to the front reference plane TF from an intersection of the front reference plane TF and the outer edge 35*a* of the front spring portion 35. Further, a straight line M2 is extended along the outer edge 36*a* of the parallel portion 36. A length in the inserting direction of the press-fit portion 30 from an intersection P1 of the straight lines M1 and M2 to the front end of the eye hole 31 is denoted by $L_1$ [mm]. Similarly, in the front view of the press-fit portion 30, a straight line N1 is extended in a direction perpendicular to the rear reference plane TR from an intersection of the rear reference plane TR and the outer edge 37*a* of the rear spring portion 37. A length in the inserting direction of the press-fit portion 30 from an intersection P2 of the straight line N1 and a straight line N2 (M2) extended along the outer edge 36*a* of the parallel portion 36 to the rear end of the eye hole 31 is denoted by $L_2$ [mm].

The cross-sectional secondary moment of area per unit length of the front spring portion $G_1$ is defined as $I_1/L_1$ [$mm^3$], and the cross-sectional secondary moment of area per unit length of the rear spring portion rear spring strength $G_2$ is defined as $I_2/L_2$ [$mm^3$].

[Concerning Cross-Sectional Secondary Moments]

A cross-sectional secondary moment is a quantity representing deformation difficulty of a member corresponding to a cross-sectional shape. The cross-sectional secondary moments in the front reference plane TF and the rear reference plane TR are, for example, obtained as follows.

Figure 5:
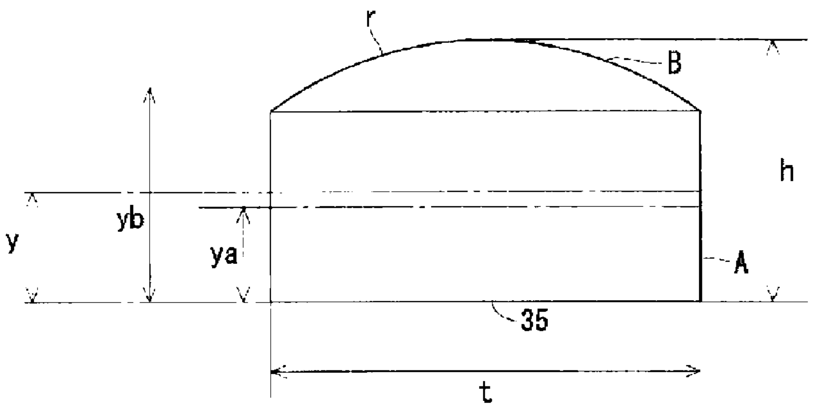
FIG. 5 is a diagram showing a cross-sectional shape of a front spring portion in a front reference plane.

A cross-sectional shape of the front spring portion 35 in the front reference plane TF is a combined shape of a first part A having a rectangular shape and a second part B obtained by cutting a part of a circle by a straight line as shown in FIG. 5. Thus, the cross-sectional secondary moment in the front reference plane TF can be thought as the sum of a cross-sectional secondary moment of the first part A and that of the second part B.

In this cross-sectional shape, the cross-sectional secondary moment in the front reference plane TF is calculated by the following equation if t [mm] denotes the thickness of the press-fit portion 30, r [mm] denotes a radius of curvature of the outward facing part of the press-fit portion 30 and h [mm] denotes a spring thickness from an inward facing part on the side of the eye hole 31 to the outward facing part.

$$I = \{(y - y_a)^2 S_a + I_a\} + \{(y - y_b)^2 S_b + I_b \qquad \text{[Equation 1]}$$

$$\text{where: } I_a = \frac{t[h - r\{1 - \sqrt{1 - \left(\frac{t}{2}\right)^2}\}]^3}{12},$$

$$I_b = \frac{r^4}{24}\{6\sin^{-1}\frac{t}{2r} - 3\sin(2\sin^{-1}\frac{t}{2r}) - 2\left(\frac{t}{2r}\right)\sin(2\sin^{-1}\frac{t}{2r})\}$$

$$S_a = t[h - r\{1 - \sqrt{1 - \left(\frac{t}{2}\right)^2}\}]$$

$$S_b = \frac{r^2}{2}\left\{2\sin^{-1}\frac{t}{2r} - \sin\left(2\sin^{-1}\frac{t}{2r}\right)\right\}$$

$$y_a = \frac{h - r\{1 - \sqrt{1 - \left(\frac{t}{2}\right)^2}\}}{2}$$

$$y_b = \frac{4r}{3}\frac{\left(\frac{t}{2r}\right)^3}{2\sin^{-1}\frac{t}{2r} - \sin\left(2\sin^{-1}\frac{t}{2r}\right)} - (r - h)$$

$$y = \frac{S_a y_a + S_b y_b}{S_a + S_b}$$

Note that, in the above equation, Ia denotes the cross-sectional secondary moment of the first part A and Ib denotes the cross-sectional secondary moment of the second part B. Further, Sa denotes the cross-sectional area of the first part A and Sb denotes the cross-sectional area of the second part. Furthermore, ya denotes the position of a neutral axis of the first part A, yb denotes the position of a neutral axis of the second part B, and y denotes the position of an entire combined neutral axis of the first and second parts A, B.

The cross-sectional secondary moment in the rear reference plane TR is also obtained in the same way as above.

The above cross-sectional secondary moment calculation method is an example. The cross-sectional secondary moments can be obtained by a calculation method based on the cross-sectional shape of the front spring portion 35 in the front reference plane TF, the cross-sectional shape of the rear spring portion 37 in the rear reference plane TR and the like.

According to the press-fit terminal 20 configured as just described, since $G_1+G_2$ is 0.030 [$mm^3$] or more and 0.080 [$mm^3$] or less and $G_1 \tan\theta$ is 0.0024 or more and 0.0070 or less, the insertion force, the holding force and the contact area can be balanced at a high level for the press-fit terminal 20 having the thickness of 0.75 mm or more and 0.85 mm or less.

Such a press-fit terminal 20 can be suitably used such as when the press-fit terminal 20 is provided at a location where vibration is applied or when it is desired to firmly hold the press-fit terminal 20 on the board 12 at a power supply point.

In the above press-fit terminal 20, $G_1+G_2$ may be 0.030 [$mm^3$] or more and 0.060 [$mm^3$] or less and $G_1 \tan\theta$ may be 0.0028 or more and 0.0060 or less. In this way, the insertion force, the holding force and the contact area can be balanced at an even higher level for the press-fit terminal 20 having the thickness of 0.75 mm or more and 0.85 mm or less.

Further, the outer edge 35*a* of the front spring portion 35 is inclined inward in the width direction of the press-fit portion 30 toward the front, and the outer edge 37*a* of the rear spring portion 37 is inclined inward in the width direction of the press-fit portion 30 toward the rear. Thus, if the press-fit terminal 20 is press-fit into the through hole 13, the press-fit portion 30 can be easily deformed due to the presence of the front spring portions 35 and the rear spring portions 37 having the outer edges 35*a*, 37*a* inclined with respect to the parallel portions 36.

Further, since the outward facing part of the parallel portion 36 is formed into the arcuate surface 36*f*, the parallel portion 36 easily contacts the inner peripheral surface of the through hole 13 with a large surface and the contact area can be further increased.

Particularly, if the radius of curvature r of the arcuate surface 36*f* is equal to or smaller than the radius of the through hole 13, the central part of the arcuate surface 36*f* easily contacts the inner peripheral surface of the through hole 13 in a relatively large area and the contact area can be further increased.

Figure 6:
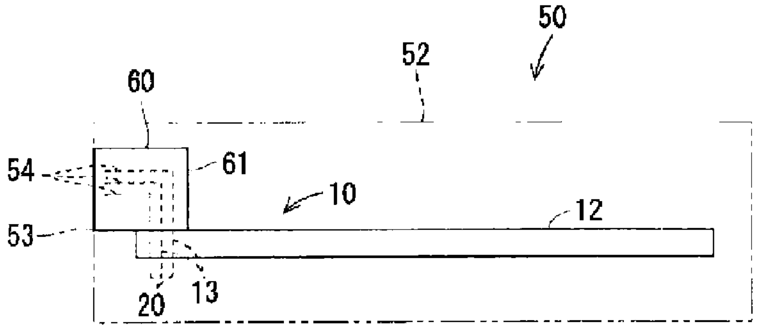
FIG. 6 is a schematic diagram showing a connector device.

FIG. 6 is a diagram showing a connector device 50 in which the press-fit terminal 20 is press-fit into the board 12. The connector device 50 is provided with the board 12 and a connector 60. The connector 60 includes the above press-fit terminal 20. In FIG. 6, the connector terminal portion 54 is integrally connected to the base end part 26 of the press-fit terminal 20. The connector terminal portion 54 is connected to the base end part 26 while being bent (here, bent at a right angle). The connector terminal portion 54 may be linearly connected to the base end part 26. Out of the press-fit terminal 20, the base end part and the connector terminal portion 54 are mounted in a connector housing 61 of the connector 60. The base end part may come out from the connector housing 61. The connector terminal portion 54 is arranged to project toward an opening from the bottom of a space in the connector housing 61. Here, a plurality of the press-fit terminals 20 are mounted in the connector housing 61. Thus, a plurality of the connector terminal portions 54 are arranged at intervals in the connector housing 61. Further, the plurality of press-fit terminals 20 project from the outer surface of the connector housing 61. The plurality of press-fit terminals 20 projecting from the outer surface of the connector housing 61 are simultaneously press-fit into a plurality of the through holes 13. With the plurality of press-fit terminals 20 press-fit in the plurality of through holes 13, the connector 60 is mounted and fixed to the board 12. An assembly of the board 12 and the connector 60 mounted and fixed to the board 12 may be called a connector-equipped board 10.

A case 52 is in the form of a casing having a space capable of accommodating the board 12. The case 52 is formed with an opening 53 for exposing the connector housing 61 to outside. With the connector housing 61 disposed in the opening 63, the board 12 is fixed in the case 52. The board 12 is fixed in the case 52, using a screwing structure, a fit-in structure, a composite structure of those, or the like.

In the connector device 50 as described above, since the press-fit portion 30 having the thickness of 0.75 mm or more and 0.85 mm or less is inserted into the through hole 13 without requiring an excessive insertion force, damage on the board 12 is suppressed. Further, since the holding force and the contact area are also satisfactory after the insertion, the press-fit portion 30 is firmly held in the board 12 and the electrical connection reliability of the press-fit terminal 20 and the circuit of the board 12 can also be improved.

Further, if the radius of curvature r of the outward facing part of the parallel portion 36 is equal to or smaller than the inner circumference radius of the through hole 13, the contact area of the press-fit portion 30 and the inner peripheral surface of the through hole 13 increases.

EXAMPLES

In Examples, assuming the press-fit terminal 20 described in the above embodiment, the evaluation of the insertion force, the holding force and the contact area is described for Examples A1-A4, B1-B5, C1-C5 and D1-D4 in which G ($G_1+G_2$) and $G_1$ tan θ were changed. The evaluation was derived by a CAE (Computer Aided Engineering) analysis using a finite element method.

G ($G_1+G_2$) of Examples A1-A4 is 0.077, G ($G_1+G_2$) of Examples B1-B5 is 0.052, G ($G_1+G_2$) of Examples C1-C5 is 0.033, and G ($G_1+G_2$) of Examples D1-D4 is 0.027. In each of groups of Examples A1-A4, B1-B5, C1-C5 and D1-D4, the value of $G_1$ tan θ is changed. Note that the thickness of the press-fit terminal 20 is 0.8 mm, and the diameter ϕ of the through hole 13 is 1.45 mm.

Evaluation results are shown in FIGS. 7 and 8. As shown in FIGS. 7 and 8, it is understood that the insertion force, the holding force and the contact area can be balanced at a high level in the case of Examples A1, B1, B2, B3, B4, C2, C3, C4 and C5 in which G ($G_1+G_2$) is 0.030 or more and 0.080 or less and $G_1$ tan θ is 0.0024 or more and 0.0070 or less. For example, it can be understood that the insertion force of 104.8 N or less, the holding force of 42.4 N or more and the contact area of 1.01 $mm^2$ or more can be realized.

Further, it is understood that the insertion force, the holding force and the contact area can be balanced at an even higher level in the case of Examples B1, B2, B3, C3, C4 and C5 in which G ($G_1+G_2$) is 0.030 or more and 0.060 or less and $G_1$ tan θ is 0.0028 or more and 0.0060 or less. For example, it can be understood the insertion force of 100.1 N or less, the holding force of 43.4 N or more and the contact area of 1.01 $mm^2$ or more can be realized.

Note that the respective components described in the above embodiment and each modification can be appropriately combined as long as these do not contradict each other.

LIST OF REFERENCE NUMERALS

10 connector-equipped board
12 board
13 through hole
13*f* electrically conductive layer
20 press-fit terminal
22 tip part
26 base end part
30 press-fit portion
31 eye hole
34 contact piece
35 front spring portion
35*a* outer edge
36 parallel portion
36*a* outer edge
36*f*, 136*f* arcuate surface
37 rear spring portion
37*a* outer edge
50 connector device
52 case
53 opening
54 connector terminal portion
60 connector
61 connector housing
A first part
B second part
TF front reference plane
TR rear reference plane

What is claimed is:

1. A press-fit terminal to be press-fit into a through hole formed in a board, comprising:

a press-fit portion including two contact pieces facing each other across an eye hole, each of the two contact pieces including a parallel portion in parallel to that of the other contact piece, a front spring portion extending from the parallel portion in an inserting direction of the press-fit portion and a rear spring portion extending from the parallel portion in a direction opposite to the inserting direction of the press-fit portion, a thickness of the press-fit portion being 0.75 mm or more and 0.85 mm or less, when $G_1$ [$mm^3$] and $G_2$ [$mm^3$] denote a cross-sectional secondary moment of area per unit length of the front spring portion and a cross-sectional secondary moment of area per unit length of the rear spring portion calculated under the following conditions for the press-fit portion, respectively, $G_1+G_2$ being 0.030 or more and 0.080 or less, and when θ denotes a gradient of the front spring portion with respect to the inserting direction of the press-fit portion, $G_1 \tan\theta$ being 0.0024 or more and 0.0070 or less,

[conditions]

the inserting direction of the press-fit terminal being a forward direction and the direction opposite to the inserting direction being a rearward direction, a position of 0.1 mm from and behind a rear end of the eye hole being a front reference and a position of 0.1 mm from and in front of a rear end of the eye hole being a rear reference, a plane perpendicular to an outer edge of the front spring portion from an inner edge of the front spring portion at the front reference being a front reference plane and a cross-sectional secondary moment of the front spring portion in the front reference plane being denoted by $I_1$ [$mm^4$], a plane perpendicular to an outer edge of the rear spring portion from an inner edge of the rear spring portion at the rear reference being a rear reference plane and a cross-sectional secondary moment of the rear spring portion in the rear reference plane being denoted by $I_2$ [$mm^4$], a length in the inserting direction of the press-fit portion from an intersection of a straight line extending in a direction perpendicular to the front reference plane from an intersection of the front reference plane and the outer edge of the front spring portion and a straight line extending along an outer edge of the parallel portion to the front end of the eye hole being denoted by $L_1$ [mm], a length in the inserting direction of the press-fit portion from an intersection of a straight line extending in a direction perpendicular to the rear reference plane from an intersection of the rear reference plane and the outer edge of the rear spring portion and a straight line extending along the outer edge of the parallel portion to the rear end of the eye hole being denoted by $L_2$ [mm], and the cross-sectional secondary moment of area per unit length of the front spring portion $G_1$ being $I_1/L_1$ [$mm^3$] and the cross-sectional secondary moment of area per unit length of the rear spring portion $G_2$ being $I_2/L_2$ [$mm^3$].

2. The press-fit terminal according to claim 1, wherein:

$G_1+G_2$ is 0.030 or more and 0.060 or less, and $G_1 \tan\theta$ is 0.0028 or more and 0.0060 or less.

3. The press-fit terminal according to claim 1, wherein a thickness of the press-fit portion is 0.8 mm.

4. The press-fit terminal according to claim 1, wherein:

the outer edge of the front spring portion is inclined inward in a width direction of the press-fit portion toward front, and the outer edge of the rear spring portion is inclined inward in the width direction of the press-fit portion toward rear.

5. The press-fit terminal according to claim 1, wherein an outward facing part of the parallel portion is formed into an arcuate shape when viewed along the inserting direction.

6. A connector device, comprising:

a connector including the press-fit terminal according to claim 5; and a board formed with a through hole, the press-fit portion of the press-fit terminal being press-fit into the through hole, and a radius of curvature of the outward facing part of the parallel portion being equal to or smaller than an inner circumference radius of the through hole when viewed along the inserting direction.

* * * * *